US008476557B2

(12) United States Patent
Bergerot et al.

(10) Patent No.: US 8,476,557 B2
(45) Date of Patent: Jul. 2, 2013

(54) DEVICE FOR HEATING A CYLINDRICAL COMPONENT AND USE IN ASSEMBLING AN INTER-SHAFT BEARING IN A TURBOMACHINE

(75) Inventors: Francois Pierre Andre Bergerot, Dammarie les Lys (FR); Laurent Leeder, Saint Germain les Corbeil (FR); Jacques Pierre Felix Malterre, Moisenay (FR); Bernard Adrien Edmond Souart, Savigny le Temple (FR); Hubert Thomas, Savigny le Temple (FR)

(73) Assignee: Snecma, Paris (FR)

( * ) Notice: Subject to any disclaimer, the term of this patent is extended or adjusted under 35 U.S.C. 154(b) by 35 days.

(21) Appl. No.: 13/170,700

(22) Filed: Jun. 28, 2011

(65) Prior Publication Data

US 2011/0252644 A1 Oct. 20, 2011

Related U.S. Application Data

(62) Division of application No. 11/466,998, filed on Aug. 24, 2006, now Pat. No. 7,989,733.

(30) Foreign Application Priority Data

Aug. 26, 2005 (FR) ...................................... 05 52578

(51) Int. Cl.
*H05B 3/00* (2006.01)
*H05B 3/06* (2006.01)

(52) U.S. Cl.
USPC ............................................ 219/201; 219/521

(58) Field of Classification Search
USPC .............. 219/639, 85.16, 228, 201, 507, 521; 29/889.2, 889.3, 889.4, 889.5, 889.21, 428, 29/800, 447; 384/557, 467
See application file for complete search history.

(56) References Cited

U.S. PATENT DOCUMENTS

| 3,680,979 A | 8/1972 | Hansen et al. |
| 3,723,705 A | 3/1973 | Province |
| 4,167,809 A * | 9/1979 | Boyland et al. .................. 29/800 |
| 5,537,814 A | 7/1996 | Nastuk et al. |
| 7,594,324 B2 | 9/2009 | Bergerot et al. |

FOREIGN PATENT DOCUMENTS

| EP | 0 330 630 A1 | 8/1989 |
| GB | 723882 | 2/1995 |
| RU | 1776950 A1 | 11/1992 |

* cited by examiner

*Primary Examiner* — Quang Van
*Assistant Examiner* — Hung D Nguyen
(74) *Attorney, Agent, or Firm* — Oblon, Spivak, McClelland, Maier & Neustadt, L.L.P.

(57) ABSTRACT

A device for heating a cylindrical component of given diameter is disclosed. The device includes at least two heaters each delivering a stream of hot gas and emerging in an annular chamber. The inside diameter of the annular chamber is slightly greater than the diameter of the cylindrical component. The device may be used for heating a metal journal in which a bearing ring for an inter-shaft bearing in a double-body turbomachine is mounted.

6 Claims, 5 Drawing Sheets

DEVICE FOR HEATING A CYLINDRICAL COMPONENT AND USE IN ASSEMBLING AN INTER-SHAFT BEARING IN A TURBOMACHINE

CROSS-REFERENCE TO RELATED APPLICATIONS

This application is a division of U.S. application Ser. No. 11/466,998 filed Aug. 24, 2006, the entire contents of which is incorporated herein by reference. U.S. application Ser. No. 11/466,998 is based upon and claims the benefit of priority from French Application No. 05 52578 filed Aug. 26, 2005.

BACKGROUND OF THE INVENTION

The present invention relates to the field of turbomachines and relates more particularly to multibody gas turbine engines. It relates to engine assembly operations and in particular to the fitting of the low pressure turbine module to a high pressure body.

DESCRIPTION OF THE PRIOR ART

A turbojet with a front turbofan and a double body, for example, comprises a low pressure (LP) body and a high pressure (HP) body. The LP body rotates at a first speed and the LP turbine drives the fan. The HP body rotates at a speed different from that of the LP turbine. The shafts of the two bodies are concentric, the low pressure shaft is guided in rotation in bearings supported by the fixed structure of the engine, respectively situated downstream of the turbine and upstream of the high pressure compressor. The shaft of the high pressure body is guided in rotation by bearings supported by the fixed structure of the engine upstream and by the shaft of the low pressure body by means of downstream inter-shaft bearings. The latter are of the roller bearing type and situated, at least according to a known engine, between the high pressure turbine and the low pressure turbine. The bearing comprises an inner ring equipped with rollers held by a cage on the LP shaft and an outer ring shrink fitted in the HP shaft. The fitting of this bearing, that is to say the assembly of the outer ring with the assembly formed by the rollers, of the cage and of the inner ring, is carried out at the same time as the mating of the low pressure turbine where the shaft, previously fitted to the low pressure turbine, is guided into the high pressure body. The term "mating" here refers to all or part of the translational movement of the LP turbine module until the flange of the outer casing of the latter comes into contact with the corresponding flange of the HP module.

It follows that the assembly of the inter-shaft bearing is carried out blind. The operator has no visibility for monitoring, in particular, the engagement of the rollers in the HP rotor and then in the outer ring. This operation comprises high risks of damage to the bearing if the conditions are not controlled. The highest risk for the bearing is a hard contact between the rollers and the retaining nut of the outer ring and the ring itself.

At present, the means used do not make it possible to fit the LP turbine without negative impact for this inter-shaft bearing, because of the heating method used and of the imprecise positioning of the LP turbine. In particular, the heating of the HP part (equipped with the outer ring) is carried out from the inside of the journal by means of a diffuser fed by a heater. The temperature measurement is carried out manually using a probe applied against the outside of the HP part. The investigations carried out on this operating method have revealed several disadvantages:

- a relatively high heterogeneity, of the order of 20° C., of the temperature levels of the heated parts,
- a high risk of adding pollution by the ambient air taken for the heating and the heating device itself, and
- a high risk of damage of the outer ring of the bearing by contact with the diffuser. This risk is particularly high as the clearance between the diffuser and the outer ring is only a few millimeters, and the assembly is installed on rollers and therefore presenting a risk of being moved inadvertently by the operators.

SUMMARY OF THE INVENTION

The objective of the invention is to improve the device for heating the journal and, more generally, to produce a device for heating a cylindrical component.

According to the invention, these objectives are achieved with a device for heating a cylindrical component of given diameter, by means of hot gas, characterized in that it comprises at least two heaters each delivering a stream of hot gas and emerging in an annular chamber, the inside diameter of which is slightly greater than said given diameter.

Preferably, the heaters are equidistant from one another, and the enclosure includes a perforated inner wall.

Advantageously, the heaters are electrical heaters. The temperature may be continuously regulated.

More particularly, the invention relates to the use of such a device for heating a metal journal in which a bearing ring for a bearing is mounted. More particularly, the temperature at the surface of the journal is measured and the supply of hot gas is controlled according to said temperature.

The invention applies in particular to the assembling of an inter-shaft bearing in a double-body turbomachine.

BRIEF DESCRIPTION OF THE DRAWINGS

Other features and advantages will emerge on reading the following description of a non-limiting embodiment of the invention, applied to the fitting of a low pressure turbine module in the high pressure body of a double-body gas turbine, given with reference to the appended drawings in which.

DESCRIPTION OF THE PREFERRED EMBODIMENTS

Figure 1:
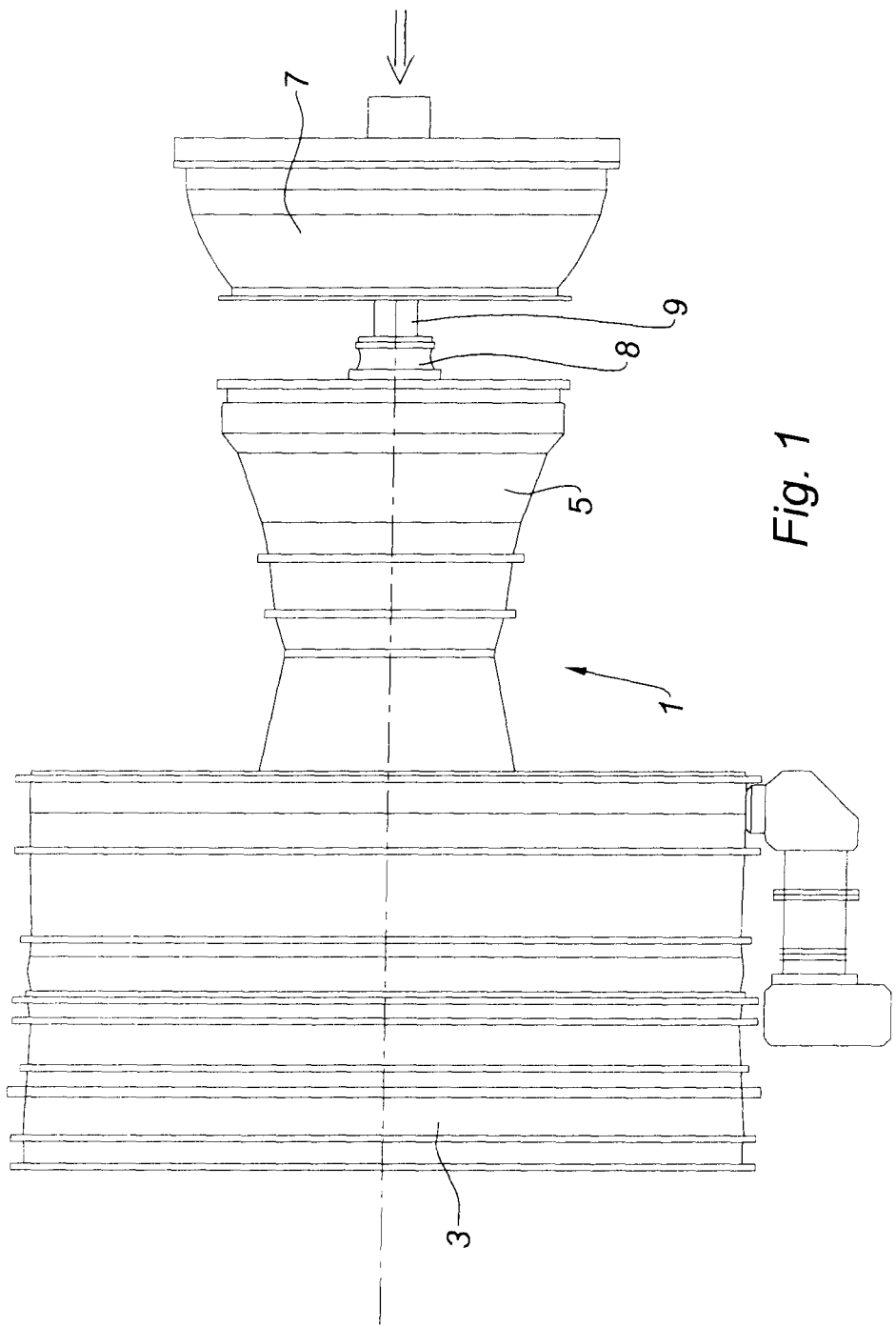
FIG. 1 shows an engine in the process of assembly.

FIG. 1 shows an engine in the process of assembly in which only the outer casings are seen. In this case it is a double-body bypass turbojet such as the CFM56. It comprises a front fan 3 and a module 5, called the first module, constituted by the HP body with its shaft, called the first shaft. These components are already assembled. In this view the LP turbine module 7, called the second module, whose shaft 9, called the second shaft, is already engaged in the HP body, is in the process of being fitted. The critical zone is situated in zone 8 of the inter-shaft bearing whose visibility is zero.

In the continuation of the description, the fitting of this second module, the low pressure module, into the first module, the high pressure module, is therefore described.

Figure 2:
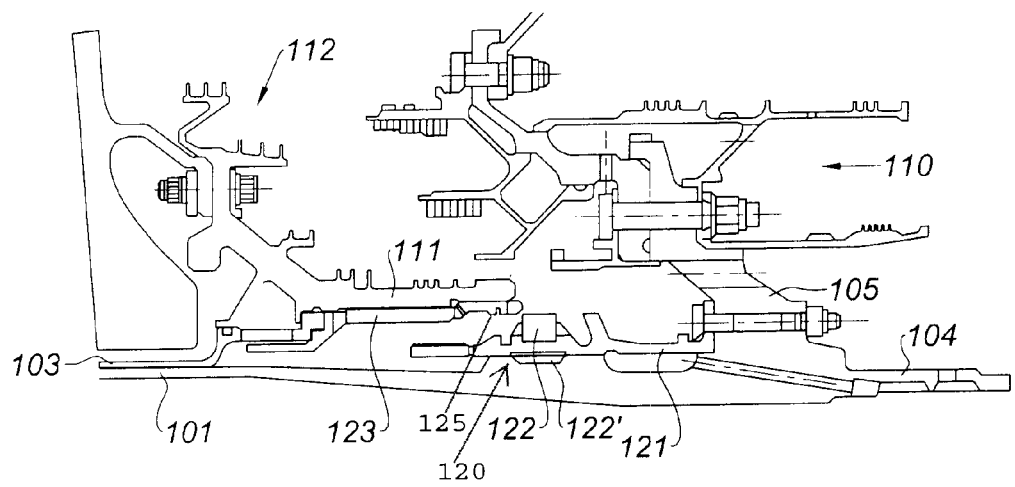
FIG. 2 shows a detail of the inter-shaft bearing before assembly.

In FIG. 2, this zone is seen in cross-section and in greater detail. The shaft 101, the second shaft of the second module, the LP turbine, is housed in the shaft 103, the first shaft, of the first module, the HP body. The shaft 101 comprises at its end, on the right of the figure, a journal 104 for the fitting of a bearing. A radial flange 105 allows the fitting of the various components constituting the LP turbine 110, which is partly visible.

The shaft 103 of the HP body is extended by a journal 111 at its downstream end. Only a part of the turbine 112 of the HP body can be seen.

Figure 3:
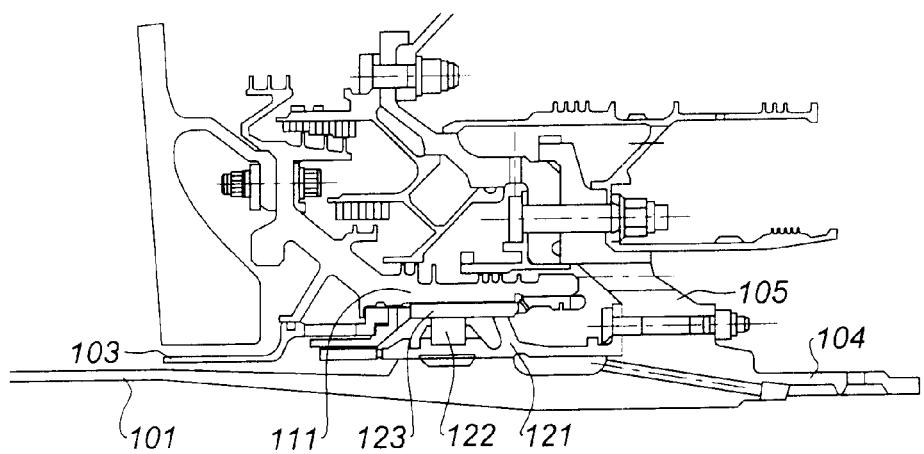
FIG. 3 shows the same zone as FIG. 2, after assembly.

The inner-shaft bearing 120, known per se, comprises an inner ring 121, fixed to the shaft 101 with the rolling elements, such as rollers 122, whose cage 122' is crimped on the ring 121. The outer ring 123 is shrink fitted inside the journal 111. It is locked in position by a nut 125. FIG. 3 shows the same components after assembly. The assembly is carried out by translational displacement of the LP turbine module 110 with the shaft 101 towards the left with respect to FIG. 2, after expansion of the journal together with the outer ring, by heating, the HP module being fixed. It is understood that because of low tolerances, there is a great risk of contact between the rolling parts. This contact can be the cause of scratches, grooves or spalling initiators which are able to result in the fracture of the bearing.

The applicant company has developed a piece of equipment allowing a secure fitting of the LP module in this environment.

Figure 6:
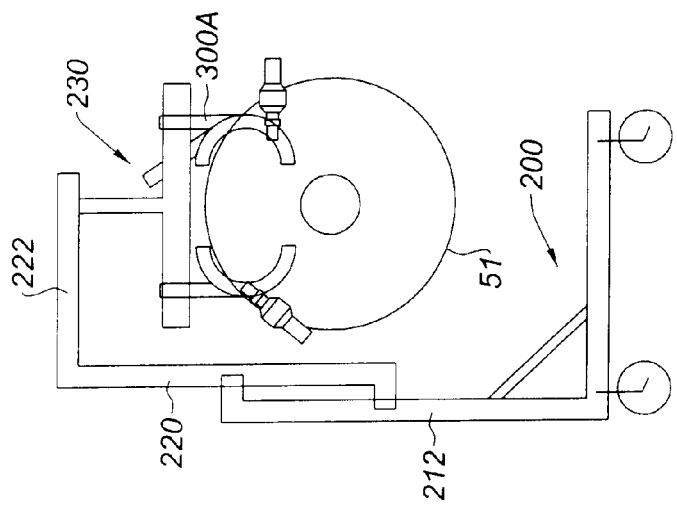
FIGS. 4 to 6 show an equipment supporting a heating device, in the position of use and in a retracted position respectively.
Figure 5:
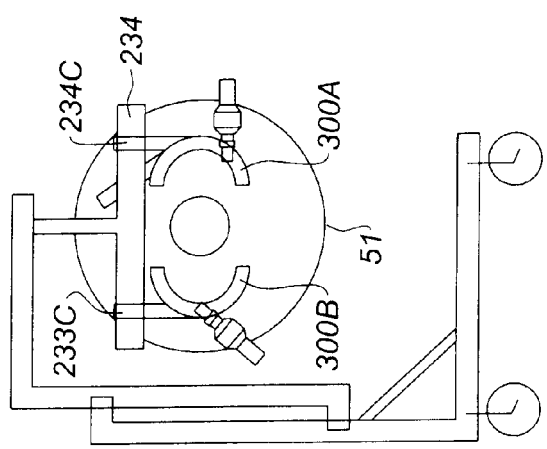
Figure 4:
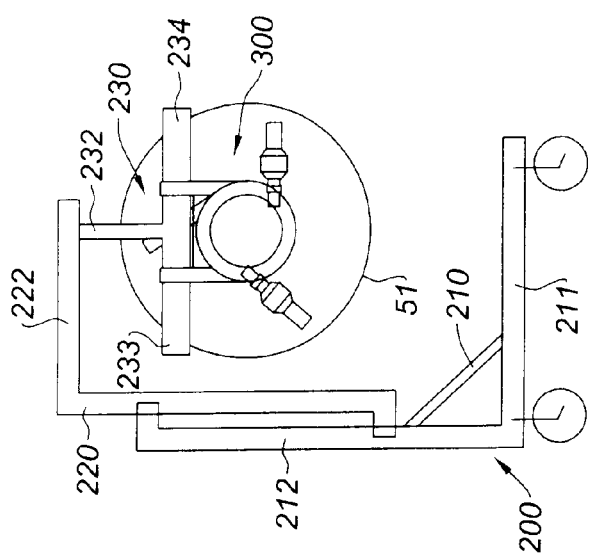

The equipment 200 comprises a mobile frame 210, from which is suspended a means of heating the HP body journal. This assembly is shown in FIGS. 4, 5 and 6 in several positions.

The frame 210 comprises a carriage 211, mounted on rollers, with a vertical frame member 212. A support beam 220 is mounted on this frame member provided with rails in order to be able to slide between a first low, active or operating, position, shown in FIG. 4, and a second high, retracted position, which is seen in FIG. 6.

A support 230 in the form of an inverted T is fixed to the end of the horizontal arm 222 of the support beam 220.

Figures 7, 8:
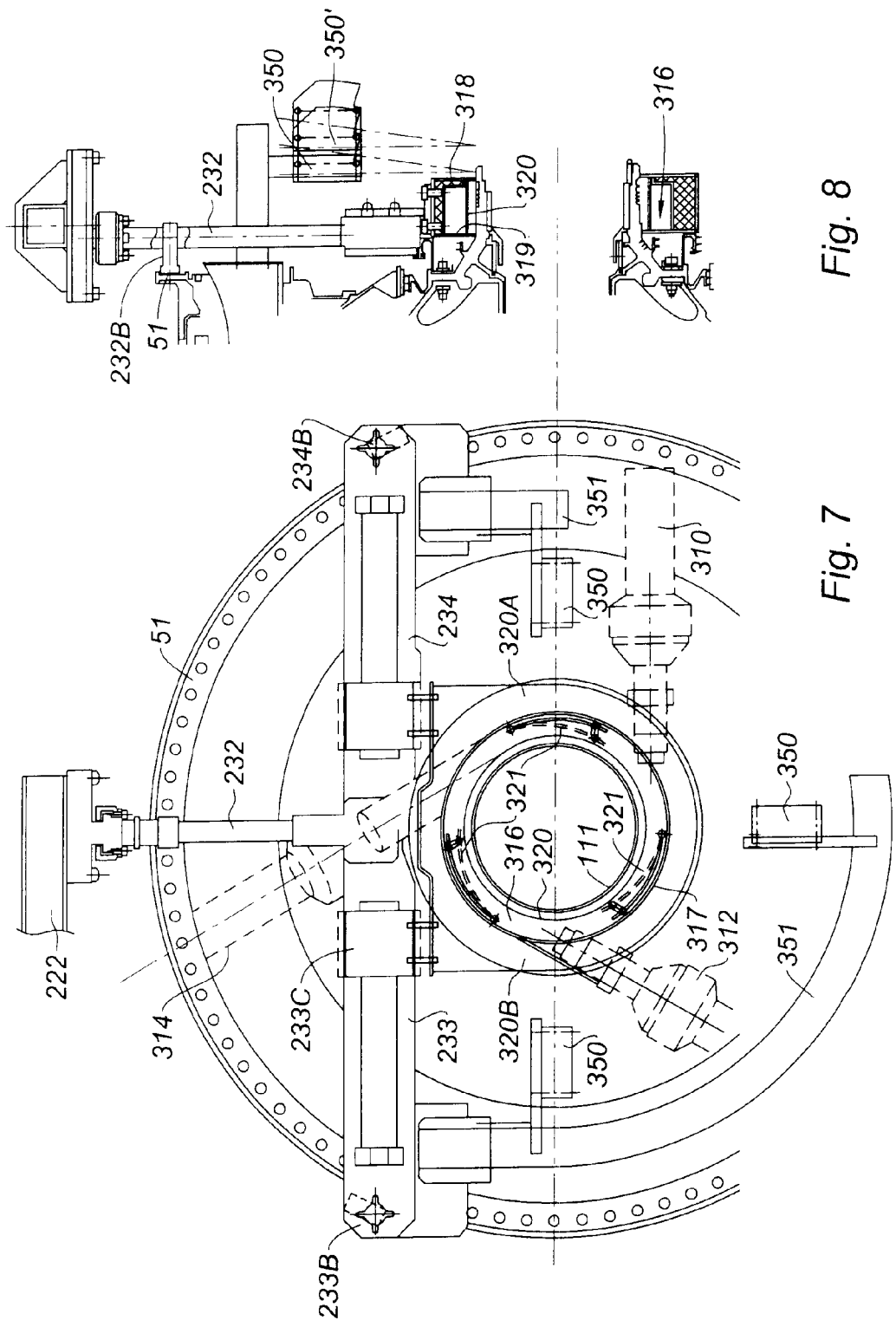
FIG. 7 shows a detail of the heating device in the position of use.
FIG. 8 is an axial cross-sectional view of the device shown in FIG. 7 in position.

The support 230 comprises a vertical arm 232 rigidly fixed with respect to the horizontal arm 222 of the support beam, and two horizontal branches 233 and 234. The latter are designed to support two sliders 233C and 234C each supporting one half of the annular heating device 300, 300A and 300B respectively, as seen in FIG. 7.

The equipment is shown in the active position in FIG. 4. The support 230 is bearing against the flange 51 of the casing of the HP body module. Starting from this position, the heating device is released by separating the two halves 300A and 300B which move in direction parallel with the two branches 233 and 234 with their respective slider 233C and 234C. Once the heating device is open, it is distanced in the upward direction by causing the support beam 220 to slide in the rails of the frame member 212. The equipment is shown in the high retracted position in FIG. 6.

The heating device is put into position using the reverse sequence.

Figure 9:
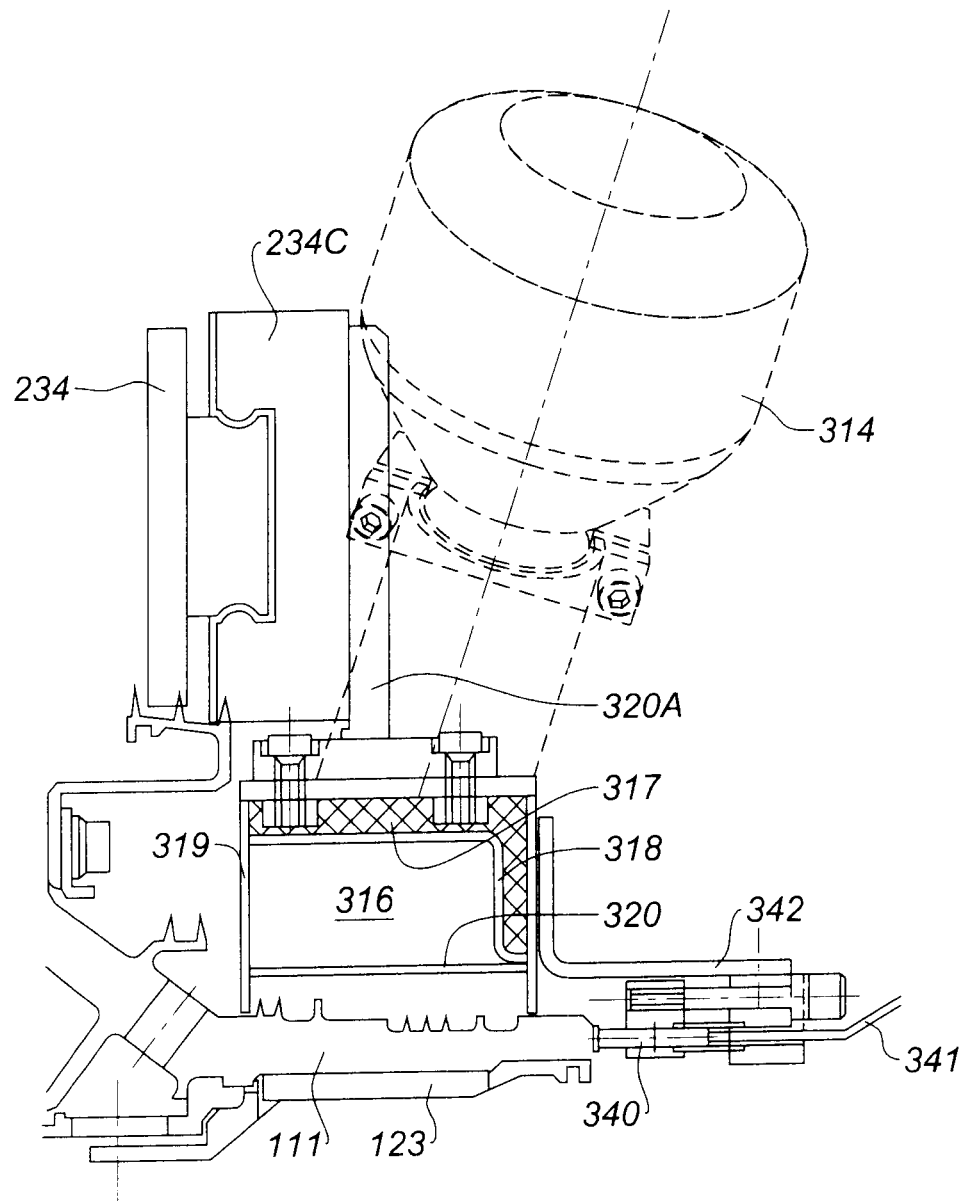
FIG. 9 illustrates a detail of the device showing a temperature sensor.

The heating device is described in more detail with reference to FIGS. 7, 8 and 9. FIG. 7, which is an enlarged view of FIG. 4, shows the heating device with three heaters 310, 312 and 314, in dotted line, disposed substantially tangentially with respect to an annular enclosure 316 forming a diffuser and air distributor. They are equidistant from each other and deliver a gas heated to a controlled temperature, air in particular, along at least one tangential component. In FIG. 9 it can be seen that the heaters, because of the bulk of the suspension cannot be disposed strictly tangentially with respect to the annular chamber 316. The latter is delimited by a cylindrical casing 317 and two walls 318 and 319, perpendicular to the axis of the engine. An inner cylindrical wall 320 is perforated and forms a space with the journal 111. The casing comprises a thermally insulating material as can be seen on the walls 317 and 318.

Deflectors 321 are disposed inside the annular enclosure between two consecutive heaters. These deflectors are arched and inclined towards the axis of the engine. The end receiving the gaseous flow from an adjacent heater is at a greater distance from the axis than is the other end. In this way the gas flows emerging into the enclosure are simultaneously driven in a rotational movement about the axis of the engine with a centripetal component towards the perforated wall 320.

The wall 318 towards the end of the journal comes into contact with the latter. The wall 319 on the other side forms a space or openings for the passage of the gasses which will heat up the thicker mass at that place of the journal. The components of the jacket 317, 318, 319 defining the annular enclosure 316 are made of two parts attached to their respective supports 320 A and B. These supports are themselves each suspended from a slider 233C and 234C respectively.

The support 230 bears against the flange 51 by stops, one of which is visible in FIG. 8. It is the stop 232B integral with the vertical arm 232 of the support. The arm 233 and 234 also comprise chocking means 234B and 233B which can be seen in FIG. 7. The chocks are retractable and become positioned behind the flange 51 in order to ensure the immobilization of the support on the flange 51.

The device serves as a support for three thermocouples 340 distributed equidistant from each other. FIG. 9 is a partial cross-sectional view of the heating device 300 at the level of one of the thermocouples 340. The latter is bearing against the downstream surface of the journal in order to sense the temperature. A cable 341 connects the sensor to the control unit which, in particular, comprises the function of controlling the heaters according to the temperature to be reached. In this example, it is seen that the thermocouple is attached to the wall 318 by means of a bracket 342.

The device also supports three instruments 350 for measuring the distance between the journal 111 and the LP shaft inside the latter. They are distributed equidistant from each other, for example at three o'clock, six o'clock and nine o'clock, as seen from the rear of the engine. The alignment of the LP shaft is carried out by comparing the differences in measurements of distances at these three points and by correlatively acting on the transverse positioning of the shaft in the handling system. The distance measuring instruments 350 are of the laser type for example. They have been shown diagrammatically in FIGS. 7 and 8. They are mounted on support arms 351 fixed on the horizontal arms of the supports 230. They can move between two positions as seen in FIG. 8 which shows a measuring instrument positioned high with respect to the axis of the engine. When they are in position 350 of the figure, they aim at the journal; by shifting them into the position 350', they aim at the low pressure shaft. It is thus possible to derive from this the clearance between the shaft and the journal. The three together distributed around the journal make it possible to know the relative position of the two axes accurately. The correction is carried out by moving the turbine module in space using the appropriate control means.

A control console is mounted on the frame. It receives the signals from the temperature sensors and the distance measurements. It also comprises means for providing alarm signals, for example of the green light/red light type, to inform the operator of the situation and of the state of preparation of the journal before mating.

The sequence of operations is as follows.

The engine is partially assembled. The fan 3 and the HP body 5 are assembled. The LP module 7 is waiting.

a) For fitting the outer ring 123 in the journal,
  the device is put into position as shown in FIG. 7, and
  the journal 111 is heated up to the temperature specified for the fitting; the obtaining of this temperature authorizes the putting into the retracted position, as shown in FIG. 6, the fitting of the ring 123, and the tightening of the nut 125;

b) For the centering of the turbine shaft,
  the equipment is put into the operating position,
  the LP shaft 101 is inserted into the HP body, and
  the distance measuring system 350 is activated. The measurements taken by the instruments 350 allow the centering of the shaft 101, within the limits specified, with respect to the journal.

c) For the heating of the journal/outer ring assembly,
  the equipment is put into the operating position, and
  the heating is started. The heating is controlled according to the temperatures measured by the thermocouples 340 until the commanded temperature is reached, to within the specified limits. The obtaining of the temperature within the specified range authorizes the putting of the equipment into the retracted position.

The assembly is completed by proceeding with the final mating.

The device of the invention provides everything with the simultaneous control of the two major assembly conditions in order to ensure risk-free assembly of the bearing.

It is furthermore understood that the invention is not limited to the fitting of the LP turbine in an HP body of a gas turbine engine. It is applicable to all equivalent situations of fitting a second module assembled by a bearing in a first module.

The invention claimed is:

1. A method for assembling an inter-shaft bearing in a double-body turbomachine comprising:
  placing a rear portion of a metal journal in which a bearing ring for a bearing is mounted in a heating device; and
  heating the metal journal using the heating device,
  wherein the heating device comprises:
    at least two heaters which deliver a stream of hot gas;
    an annular chamber defined by an outer cylindrical casing, an inner cylindrical wall and first and second walls perpendicular to an axis of the turbomachine such that the annular chamber presents a ring; and
    deflectors disposed inside the annular chamber between the heaters, the deflectors being arched and inclined towards the axis of the turbomachine and guide the stream of hot gas emerging into the annular chamber in rotational movement about the axis of the turbomachine,
  wherein the ring comprises a first half and a second half which are separable,
  wherein the heaters are disposed circumferentially about the annular chamber and are substantially tangential to the annular chamber, and
  wherein a diameter of the inner cylindrical wall is greater than a diameter of the metal journal, and
  wherein the annular chamber of the heating device surrounds the rear portion of the metal journal during the heating.

2. The method as claimed in claim 1, wherein a temperature at a surface of the journal is measured and the supply of hot gas is controlled according to said temperature.

3. The method as claimed in claim 1, further comprising:
  placing the bearing ring inside the metal journal; and
  tightening a nut to secure the bearing ring inside the metal journal.

4. The method as claimed in claim 3, wherein the heating device is retracted from the metal journal such that the first half and the second half of the ring are separated and disposed above the metal journal prior to placing the bearing ring inside the metal journal.

5. The method according to claim 3, wherein a clearance between the metal journal and the bearing ring is measured using distance measuring instruments of a laser type prior to placing the bearing ring inside the metal journal.

6. The method according to claim 1, comprising moving the heating device such that a support of the heating device abuts a flange of the turbomachine prior to heating of the metal journal.

* * * * *